G. CUSHEN.
MACHINE FOR TREATING FOOD PRODUCTS.
APPLICATION FILED JULY 31, 1917.

1,264,372. Patented Apr. 30, 1918.

Inventor
George Cushen.
by Fetherstonhaugh & Co.
Attys.

UNITED STATES PATENT OFFICE.

GEORGE CUSHEN, OF HAMILTON, ONTARIO, CANADA.

MACHINE FOR TREATING FOOD PRODUCTS.

1,264,372.  Specification of Letters Patent.  Patented Apr. 30, 1918.

Application filed July 31, 1917. Serial No. 183,757.

*To all whom it may concern:*

Be it known that I, GEORGE CUSHEN, of the city of Hamilton, in the county of Wentworth, in the Province of Ontario, Dominion of Canada, have invented certain new and useful Improvements in Machines for Treating Food Products, of which the following is the specification.

My invention relates to improvements in machines for treating food products, and the object of the invention is to devise a machine of this class, which may be used for both chopping meat, pulping fruit and grinding coffee, etc., and in which a provision is made for the ready interchange of parts to suit the various purposes to which my machine may be applied.

My invention consists of a suitable cylinder supported on a carrying frame or legs, and having an internal feeding worm, a hopper at one end of the cylinder, a pulley on the end of the feeding worm shaft, the bottom of the cylinder being perforated and provided with a co-acting perforated plate, and the discharge end of the cylinder being provided with a ring having an internal thread, whereby different fittings may be utilized for various purposes as I shall presently describe.

Fig. 2 is a perspective detail of the perforated end plate utilized when the machine is being used as a grinder for spices or the like.

In the drawings like numerals of reference indicate corresponding parts in each figure.

Figure 1:
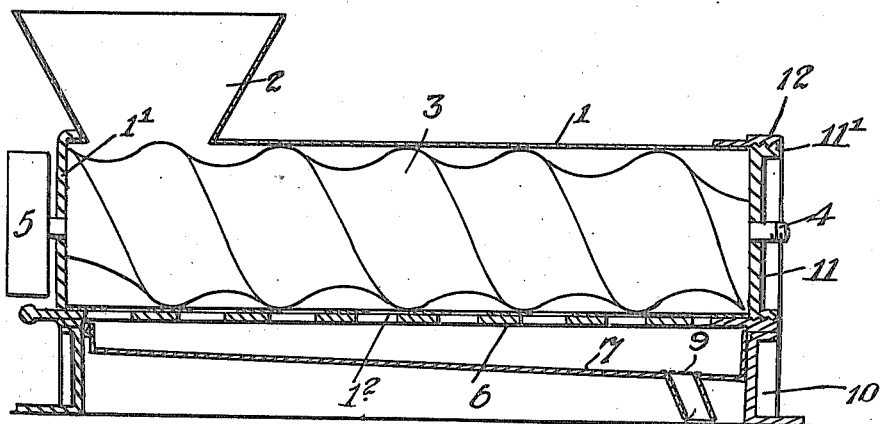
Figure 1 is a sectional plan showing my combined machine in sectional elevation.
Figure 2:
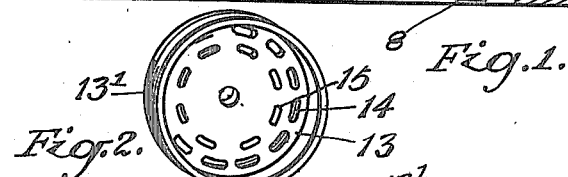

1 is a cylinder, which is provided with a hopper 2 at one end and a grinding worm 3 extending therethrough and secured on a suitable shaft 4. One end of the shaft 4 is journaled in the permanent end plate 1' of the machine and the other end is journaled in one of the several detachable end plates.

5 is a pulley secured on the shaft 4. This pulley may be used when the machine is to be used for a power machine. When it is not used for a power machine an ordinary crank handle would be provided instead.

The cylinder 1 has a perforated bottom $1^2$ with which is designed to co-act a perforated plate 6. The perforations of the bottom $1^2$ are closed by the perforated plate 6 when the machine is being used for other purposes than expressing fruit juices from the pulp.

When, however, the machine is used for the purpose of extracting the fruit juices from the pulp of different fruits the plate 6 is adjusted so as to leave the perforations open. The fruit then passes into a hopper 7 from which it is carried by a spout 8 at the end into any suitable receptacle.

I preferably provide a fine screen 9 at the top of the spout in order to keep the juices free from sediment.

The cylinder 1 is supported upon legs 10 as indicated being preferably supported on a table or other support.

When the machine is used to express fruit as referred to I provide a circular end plate 11 which is provided with an exterior thread 11', which is screwed into the ring 12 fastened at the end of the cylinder.

As before indicated I close the perforated bottom of the cylinder if I am utilizing it for other purposes than expressing juice, and in case I am grinding coffee, spices or other cereals I use instead of the end plate 11 the end plate 13 with the circular rows of holes 14 and 15 through which the ground coffee or comminuted coffee, spices or other cereal is forced.

The plate 13 is provided with an exteriorly threaded rim 13', which is screwed into the ring 12 instead of the plate 11. I also provide a supplemental ring 16 with a hood 16' for directing the ground coffee, etc., downwardly to a suitable receptacle.

Figure 6:
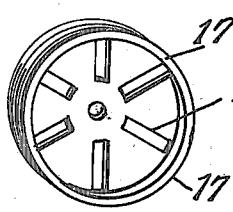
Fig. 6 is a detail of the radially slotted plate.
Figure 4:
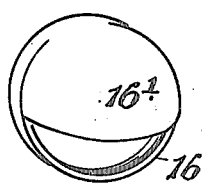
Fig. 4 is a perspective detail of the hood.
Figure 5:
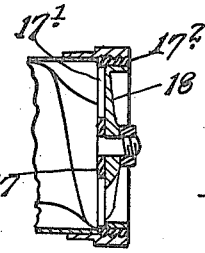
Fig. 5 is a sectional detail of the end of the cylinder showing the slotted plate and rotary knives.
Figure 3:
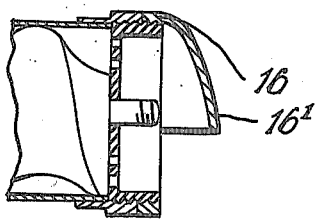
Fig. 3 is a sectional detail of the end of the machine showing the plate as shown in Fig. 2 in section, and a hood for deflecting the coffee or spices downwardly into a suitable receptacle.
Figure 7:
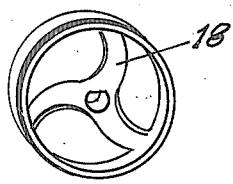
Fig. 7 is a detail of the rotary knife.

In Figs. 5, 6, and 7 which is the form of fitting which I use for slicing and chopping material I employ a plate 17 having radial slots 17' through which material is forced. The plate 17 is provided with an exterior rim 17², which is screwed into the ring 12.

On the end of the shaft 4 I secure a rotary knife 18 which is located in close proximity to the plate 17 and thereby serves to slide or chop the material as it is projected through the slot 17'. This form of the device is particularly useful in connection with meats and other material, which are carried through the cylinder by means of the converging grinding worm.

Figure 8:
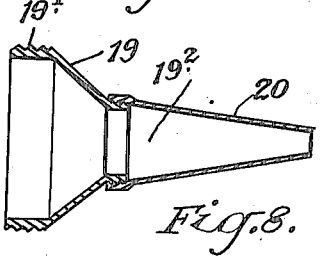
Fig. 8 is a sectional detail showing the reducing ring and funnel for sausages and other filling purposes.

In Fig. 8 I show a reducing ring 19, the threaded rim 19' of which is screwed into the ring 12. The reduced end of the rim 19 is provided with a thread 19² upon which is screwed the enlarged threaded end of the funnel 20. This form of fitting is particularly designed to provide a means for filling sausages, or other like purposes, the pulp produced through the converging grinding worm being forced through the reducing ring 19 and the funnel 20.

Although in this specification I describe my machine as applied to various purposes, and different fittings necessary to effect these different purposes it will be understood that various changes may be made without departing from the spirit of my invention.

It will, however, be understood that by the construction I have adopted I am enabled to utilize the machine very advantageously for many different uses.

What I claim as my invention is:

1. The combination with a cylinder perforated at the bottom and a support therefor, and a feeding hopper located at one end, of a conveying grinding worm secured in a central shaft and permanently journaled at the feeding end, a detachable discharge end for the cylinder forming a journal for the opposite end of the shaft, a receiving hopper located beneath the plate and provided with a spout at the discharge end, and means for opening and closing the entrance to the receiving hopper.

2. The combination with a cylinder perforated at the bottom and a support therefor, and a feeding hopper located at one end, of a conveying grinding worm secured in a central shaft and permanently journaled at the feeding end, a detachable discharge end for the cylinder forming a journal for the opposite end of the shaft, and a perforated slide provided with perforations designed to register with the perforations in the bottom of the cylinder in one position and longitudinally adjustable so as to close the perforations.

GEORGE CUSHEN.

Witnesses:
GERTRUDE NICHOLSON,
J. W. G. MITCHELL.